April 4, 1972   J. HEDGPETH   3,654,149
METHOD AND SYSTEM FOR PURIFYING WATER
Filed May 4, 1970

JOEL HEDGPETH
INVENTOR

Huebner & Worrel
ATTORNEYS

United States Patent Office 3,654,149
Patented Apr. 4, 1972

3,654,149
METHOD AND SYSTEM FOR PURIFYING WATER
Joel Hedgpeth, Clovis, Calif., assignor to
Huebner & Worrel
Filed May 4, 1970, Ser. No. 34,261
Int. Cl. C02b 1/18
U.S. Cl. 210—61    7 Claims

ABSTRACT OF THE DISCLOSURE

An improved method and system for purifying water, particularly that of swimming pools, contaminated by the presence of micro-organisms such as bacteria, algae, and like organic matter, and characterized by steps and means for introducing oxygen into the water to be purified in the presence of water soluble catalytic metallic ions, for achieving an oxidation of the contaminant, and for achieving an introduction of carbon dioxide into the water at a rate sufficient to establish and maintain the water at a suitable pH, whereby the metallic ions are held in solution and continuously made available to act as a catalyst in the oxidation process.

BACKGROUND OF THE INVENTION

The invention relates to an improved method and system for purifying contaminated water, and more specifically to a method and system for introducing oxygen into a body of water, containing therein catalytic metallic ions in solution, to achieve oxidation of micro-organisms and organic matter present within the body of water.

The prior art is replete with methods and systems for purifying contaminated water. Basically, techniques presently employed in purifying contaminated water have certain common characteristics. In nearly all instances an effort is made to remove the solid materials suspended in the water, whereupon the water is subjected to certain treatments employing chemical agents for the purpose of destroying micro-organisms and organic matter contained therewithin. In most instances the chemical agent employed in combating bacteria and organic matter is the chemical element oxygen which serves to oxidize and thereby "kill" microorganisms with which it is brought into contact. For example, the often employed chlorination technique utilizes oxygen freed from water molecules to accomplish the desired oxidation of micro-organisms. Where hypochlorite compounds are employed, in either liquid, tablet or powder form, the compounds serve to contribute free oxygen, as well as to liberate molecules from the water, for oxidizing impurities.

Presently, the burgeoning population, coupled with existing water shortages, imposes a need for more economic and facile methods and apparatus for purifying and reclaiming "used" water. Further, the "back-yard swimming pool" business has become a relatively large business. However, growth of this business is inhibited because of the effort normally required for maintaining a pool in a desired "clean" condition.

It now is common practice to treat the water of swimming pools with chemicals such as chlorides and iodines, for destroying ever-present bacteria and algae. Experience has shown that where the chlorine content is below the determinable level, algae and bacteria are present in undesired quantities and cause deleterious and dangerous conditions to arise. It is known that green algae tends to cause a swimming pool to appear unsightly, while black algae not only causes unsightly spots to appear on the floor and wall surfaces of the pool, but is parasitic and tends to pit and roughen the pool's surface. As for bacteria, it can readily be appreciated that bacteria living within the water of a pool may cause infections and communicable diseases to spread among bathers coming into contact therewith.

In those instances where chlorine is used to combat the bacteria, through oxidation, "balance" is achieved by adding enough acid to the pool to establish a determinable pH and then adding chlorine of a quantity sufficient to bring the chlorine content within a prescribed range sufficient to effect oxidation of micro-organisms. To achieve this, however, requires significant effort, since various deleterious and dangerous conditions arise when the chlorine or the acid is present in disproportionate quantities. If, in attempting to raise the chlorine content of the water to an effective level, an excess quantity of chlorine is introduced, the membranes of the eyes, ears and nasal passages of pool users often become irritated, thus causing unpleasant sensations as well as presenting the irritated membranes for attack by infectious organisms. A similar result occurs where an excess quantity of acid is introduced in attempting to lower the pH of the pool to an acceptable range. Additionally, where an excess of acid is introduced so that the pH level is substantially below neutral, the acid tends to attack the metal of the pool "equipment" causing metal ions to be suspended and/or dissolved within the water of the pool. In addition to shortening the operative life of the associated equipment, the materials normally in solution in the water will precipitate once the pH is reversed to a certain point. As a consequence, numerous and unsightly stains rapidly appear in the pool. Quite often such stains and deposits prove to be economically undesirable because of the thus caused depreciation of the value of the pool or the costs involved in their removal.

Historically, purification of water has been achieved by exposing water to oxygen in the presence of metallic ions, such as silver, copper, gold, platinum and the like. This method of decontamination takes advantage of the so-called oligo-dynamic or catalytic effect of metallic ions which permits oxygen contained within water and acting in the presence of dissolved metallic ions to attack and destroy bacteria, algae and like organic matter, through an oxidizing process. Unfortunately, this method has not proven to be entirely reliable over extended periods of time. For example, where attempts heretofore have been made to employ this method for treating algae and bacteria growth, the effectiveness has been short-lived, since the treated pools will remain "clean" for only relatively short periods of time before the growth of micro-organisms is initiated.

SUMMARY OF THE INVENTION

The instant invention overcomes the aforementioned difficulties through the use of an economic, simplified and highly effective method and system adapted for purifying water by cyclically introducing carbon dioxide into water to be purified in the presence of oxygen and dissolved metallic ions so that the water is caused to be maintained at a predetermined pH, whereby the metallic ions are permitted to remain in solution and effectively available to act as catalyst as the oxygen actively attacks bacteria and organic matter contained within the water and which may be employed separately or employed in conjunction with existing methods and systems for enhancing the effectiveness thereof.

Accordingly, an object of the instant invention is to provide an improved method and system for purifying water.

Another object is to provide in a method, which employs the steps of introducing oxygen into the water in the presence of metallic ions for purifying the water, the step of introducing carbon dioxide into the water for maintaining the pH thereof at a value sufficient for prolonging the effective catalytic life of the metallic ions.

Another object is to provide an improved method for purifying water present within a swimming pool.

Another object is to provide in a method of treating waters of swimming pools the step of introducing carbon dioxide into the water for maintaining the water of the pools at selected pH values.

Another object is to provide an improved, economic and efficient method for purifying waters of swimming pools utilizing oxygen in the presence of metallic ions.

Another object is to provide in a method of purifying water of a swimming pool utilizing oxygen in the presence of catalytic metallic ions the step of percolating carbon dioxide therethrough to effectively prolong the effective life of the ions.

Another object is to provide an improved system for purifying water.

Another object is to provide an improved system for purifying waters of a swimming pool.

Another object is to provide in a system for delivering water soluble catalytic metallic ions to a body of water and for cycling oxygen throughout the body of water in the presence of the ions for achieving an oxidation of bacteria and organic material present within the water and for controllably percolating carbon dioxide through the body of water thus to achieve a desired pH for prolonging the effectiveness of the metallic ions.

Another object is to provide in a system for delivering water soluble metallic ions to the waters of swimming pools, for percolating oxygen through the waters in the presence of the ions for achieving an oxidation of bacteria and organic matter present within the waters, and means for controllably percolating carbon dioxide through the waters of the body to control the pH thereof.

These together with other objects and advantages will become readily apparent with reference to the following description and claims in light of the accompanying drawing.

BRIEF DESCRIPTION OF THE PREFERRED EMBODIMENT

Figure 1:
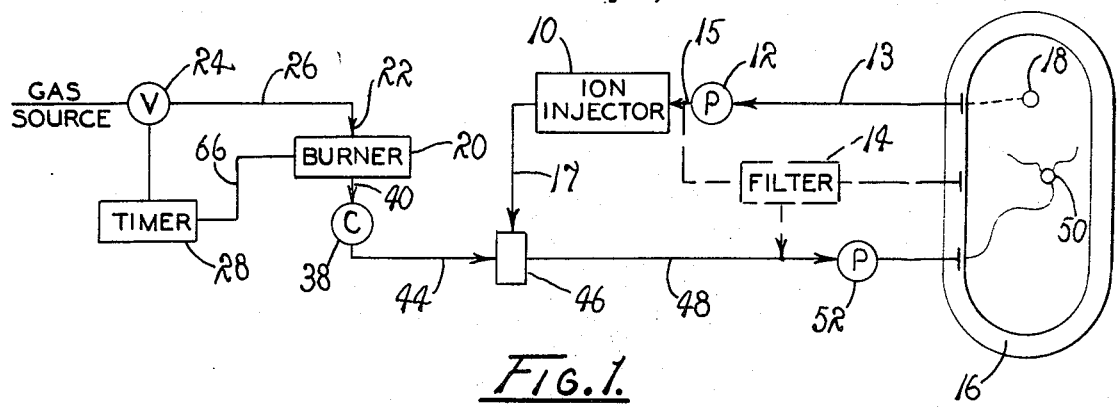
FIG. 1 is a perspective, schematic view of a system embodying the principles of the present invention illustrating the interrelationship of the various system components.

Briefly, the system of the instant invention is provided with a suitable mechanism for percolating free oxygen through a body of water in the presence of free metallic ions, preferably of transition series.

The metallic ions are employed as a catalyst for enhancing oxidation of micro-organisms while the water is held at an appropriate pH for rendering the ions effective. Normally, the source of ions is a chemical compound which, when dissolved, liberates metallic ions for use as a catalyst. In practice, copper, silver, zinc, in the form of copper sulfate, silver chloride, silver nitrate and zinc chloride have been found to be suited for use in purifying water, since these compounds are water soluble and liberate metal ions in a manner such as to serve quite satisfactorily as catalyst for enhancing the oxidation of microorganisms in the presence of free oxygen. Accordingly, the pH value of the water should be maintained below a value of 7.8 in order to preclude precipitation and thus maintain the metallic ions in a free state.

It is contemplated that gold and platinum also may be used, where practical. However, since powdered copper sulfate is economical and readily available, it has been found to be particularly suited for use as the catalyst. While the amounts of the ion source employed may be varied, as required to achieve the desired result, it has been found that where powdered copper sulfate is utilized, it should be supplied in a minimum quantity of one part, by weight, per eight million parts of water. Preferably, the range of quantities employed extends between one-eighth part, by weight, per million parts of water, to five parts, by weight, per million parts of water. By simple calculation, the desired quantity of the compound to be delivered may readily be determined.

The mechanism employed to deliver the ion source is of any suitable design and receives and delivers the compound in any of its currently available forms. To this end a conduit connected hopper-valve, not shown, may be employed quite satisfactorily. Such valves are of a type which, upon a single actuation, reciprocate to introduce powdered material into a water-filled container from which the water periodically is syphoned and delivered. Since various mechanisms can be employed, and the specific structure for the ion injector forms no part of the instant invention, a detailed description thereof is omitted in the interest of brevity. However, it is to be understood that the injector is intended to receive therein a quantity of copper sulfate and to deliver, at predetermined intervals, selected quantities which ultimately are delivered to the water being treated. Furthermore, delivery of the desired quantities of the source of catalytic ions can, if desired, be achieved simply by manually introducing the powdered material into the water. As has been accomplished, the metal ions also can be introduced by manually depositing copper, gold and silver, as bars and plates, in as pure a form as practical in the water so that the metal is permitted to slowly provide the required ion content for the body of water being treated.

While the system embodying the principles of the instant invention may be used in various environments, it is particularly suited for use in purifying the waters of swimming pools. As illustrated in FIG. 1, an ion injector 10 is operatively associated with a pool discharge pump 12 and its associated pool discharge conduit 13. Frequently, a filter mechanism 14, as shown in dotted lines, is also included in the system. In such instances, the output from the ion injector 10 is delivered at the output 15 of the filter pump to be ultimately delivered to a swimming pool 16 via an injector output 17.

The swimming pool 16, per se, forms no part of the present invention, therefore a detailed description is omitted. It is to be understood, however, that the pool 16 is so constructed as to include therein a suitable recirculating drain 18 for discharging the water therefrom.

In order to provide a source of carbon dioxide, a burner 20 is provided. The burner 20 is supplied through a gas intake 22 which is connected to a source of gas, such as a natural gas main, through a suitable valve 24 and an associated conduit 26. The duration of delivery of the gas through the valve 24 and conduit 26 is controlled by a convenient timer 28. Such timers are commercially available, therefore, a detailed description of the timer employed is omitted. However, it should be understood that the timer employed is of a type which may be pre-set to be cyclically operated for turning the gas valve "on" and "off" for selected durations and at predetermined intervals.

The burner 20 further includes a plurality of gas jets 30 connected with the intake 22 through which natural gas, or methane, is delivered to be oxidized or burned. As a practical matter, a baffle-like hood, generally designated 32, is provided to surround the jets 30 of the burner 20 for entrapping gases of combustion therewithin. While the hood 32 may be of any suitable design it is preferred that the hood define a chamber 34 within which the jets 30 are mounted so that gases of combustion, including carbon dioxide, are caused to be trapped therewithin.

For sustaining combustion, it is necessary that ambient atmosphere be made available to the jets 30. This is achieved through a plurality of openings 36 formed within the hood 32 at selected points adjacent the jets. Therefore, it should be understood that hydrocarbon gas delivered to the jets is consumed or oxidized employing ambient atmosphere delivered through the openings 36.

In order for the carbon dioxide generated by the combustion of methane within the chamber 34 to be delivered from the burner 20, the burner is connected with a compressor pump 38. The compressor is of any convenient design and communicates with the chamber 34 through a compression input conduit or tubing 40 having intake openings 42 formed therein. The conduit 40 extends into the chamber 34, preferably between the jets 30. At the output side of the compressor 38, there is a compressor output conduit 44 which serves to deliver the products of combustion and particularly carbon dioxide generated within the chamber 30 from the burner 20, which serves as a pool return line.

In order to achieve an introduction of the generated carbon dioxide into the pool 16, a suitable mixer-valve 46 is provided in a coupling relationship with the output 17 of the injector 10 between the conduit 44 and a pressurized aerator input conduit 48. The particular valve mixer employed is a matter of convenience, since various types of suitable valves are commercially available. Therefore, it is to be understood that the valve 46 serves as a coupling to couple the conduit 44 with the conduit 48 in a manner such that gases supplied by the compressor 38 are injected from the conduit 40 into the flow of water being directed to the pool 16 through the conduit 48 and a suitable aerator 50.

The aerator 50 is of any suitable design which serves to deliver gases throughout the body of water. In those instances wherein the system is being employed to purify the waters of a swimming pool, the aerator may take the convenient form of the currently available traveling pool-sweep which traverses the pool throughout the body of water and continuously injects water under pressure along the interfaces of the body of water, particularly near the bottom surfaces thereof. In such instances, the pool-sweep is connected to the input 48 and includes a pool-sweep pressurizer, such as a conventional pump 18 connected within conduit 48 for causing water to be ejected from the pool-sweep at relatively high velocities, whereby the pool-sweep at relatively high velocities, whereby the pool-sweep is caused to be propelled along the interfaces of the body of water.

As an alternative to employing the pool-sweep as the aerator, it may be found desirable to "lace" the bottom of the pool with suitable gas jets, not shown, so that as the gas is delivered from the compressor 38, it is caused to be percolated throughout the body of water. Therefore, should it be found convenient, numerous devices other than pool-sweeps or like devices are available and can satisfactorily be employed to circulate and percolate through the water gases acquired from the compressor.

Figure 2:
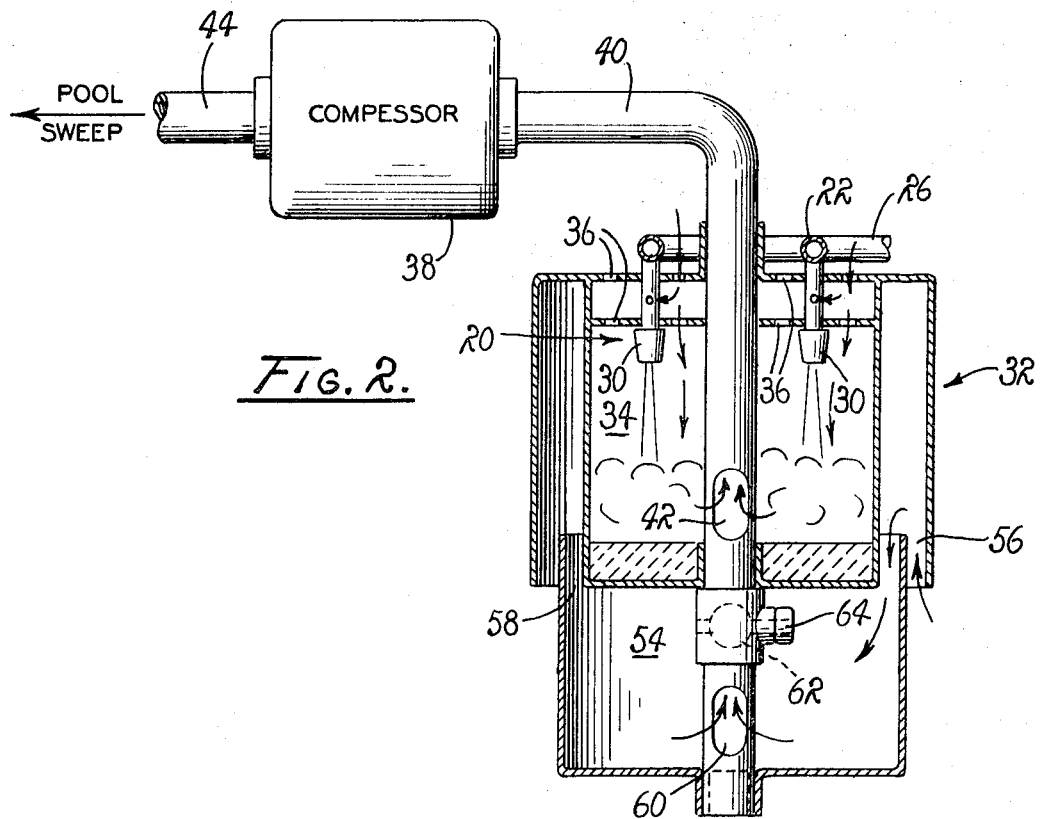
FIG. 2 is a partially sectioned elevation of the burner shown in FIG. 1.

In order to deliver oxygen to the body of water being treated, it is necessary to provide a conduit from a suitable source of oxygen to the body of water. Where the body of water is a swimming pool, as illustrated in FIG. 1, for example, it has been found convenient to utilize ambient atmosphere as the required source of oxygen. It is entirely possible and practical to achieve the necessary quantities of oxygen simply by driving the compressor 38 at a rate such that the chamber 34 is evacuated by the compressor for drawing therefrom oxygen above and beyond that required for sustaining combustion within the chamber. However, in order that the system may more efficiently be operated, the burner 20 is provided with an additional chamber 54, FIG. 2. The chamber 54 is defined within the hood 32 and communicates with ambient atmosphere through openings 56 and 58 which direct air drawn from without the hood into the chamber 54.

Within the chamber 54 there is an air intake opening 60 operatively arranged at the lowermost end of the conduit 40. Opening and closing of the intake is controlled through a suitable butterfly valve 62 suitably mounted within the conduit 40. The intake 60 permits the chamber 54 to communicate with the compressor 38 through the conduit 40 and the valve 62. In practice, the valve 62 operatively is driven through a solenoid controlled linkage 64 for achieving an open and shut condition relative of the air intake 60 relative to the compressor 38. As these valves and their associated solenoids are commercially available, a detailed description thereof is omitted in the interest of brevity. However, it is to be understood that the valve 60 will be caused to open and to close in response to suitable electrical signals applied to an associated solenoid for thus actuating the linkage 64 for opening and closing the conduit 40 between the chamber 54 and the compressor 38.

In order to acquire the desired electrical signal, the timer 28 also includes a suitable timing mechanism for selectively providing the output signals and is connected with the linkage 64 through an electrical lead 66. Therefore, it is to be understood that the valve 62 may be controlled in the same manner as is the valve 24. It also is to be understood that the valve 24 may be opened by the timer, while the valve 62 is closed, so that the compressor 38 is caused to deliver by-products of combustion from the chamber 34 while the hydrocarbon is being consumed at the jets 30. Further, the valve 62 may be opened, while the valve 24 is closed so that the output from the compressor 38 primarly consists of ambient atmosphere.

As a matter of convenience, the conduit 40 may be provided with an unvalved intake manifold-like device, not shown, disposed throughout the chamber 34 so that the conduit 40 always is in communication with an expanded portion of the chamber 34, whereby the compressor 38, when in operation, at all times is caused to extract gases from all portions of the chamber. Furthermore, should it be found convenient to do so, the intake opening 42 may be controlled by a suitable butterfly valve, not shown, which opens the conduit 40 to the chamber 34 through the opening 42 and closes the conduit 40 to chamber 54, and conversely closes the conduit 40 to the chamber 54 when the conduit 40 is opened to the chamber 34. In any event, it is to be understood that oxygen from abient atmosphere is delivered through the compressor 38 and the aerator 50, simply through a convenient arrangement of valves, which permit the compressor to draw ambient atmosphere from selected chambers of the burner 20 so that the oxygen is made readily available to the system for use throughout the pool 16 in oxidizing micro-organisms contained within the water to be purified.

Where desired, the method and system embodying the principles of the instant invention may be effectively employed with existing methods for thereby accruing advantages not heretofore achievable since the mutual pH at which the water is maintained may be employed for additional purposes.

For example, for purposes of sterilization, iodine has been found to be the most stable and consistently effective halogen. However, use of iodine has not been widely accepted as the normal consequence of use of iodine is discoloration of the water. This discoloration results from the increased pH value of the water as it normally is employed in swimming pools. Since the pH of the pool water is controlled utilizing the system of the instant invention, the color of the water may be effectively controlled while enhancing the effectiveness of the iodine present therein.

OPERATION

It is believed that in view of the foregoing description, the operation of the device will be readily understood; however, it will be briefly reviewed at this point.

It is to be understood that the method and system disclosed herein is of the general utility. It is to be further understood that the method and system disclosed herein has particular utility in purifying water contained within swimming pools.

Assuming that the system illustrated in FIG. 1 is connected with a swimming pool, operation thereof is as follows.

The pump 12, associated with metal ion injector 10, draws water from the body of water 16, via the pool discharge conduit 13, and introduces the water into the system of the ion injector 10 via the output 15 of the pump. As the water passes through the ion injector selected and determinable quantities of a source of water soluble metallic ion material such as copper sulfate is injected therein. From the ion injector, the water is circulated from the injector's output 17 through the mixer-valve 46, to the aerator 50 via conduit 48 and the pump 52.

Assuming that the pump 52 is being operated, water is injected from the conduit 48 through the pool-sweep 50 and into the pool along the interface of the body of water at the surface of the pool structure. As the pool-sweep is caused to advance, water is injected throughout the pool 16, Assuming further that the timer 28 has caused the valve 24 to open and caused the valve 62 to close, so that the compressor 38 is acting to evacuate chamber 34, by-products of combustion, including carbon dioxide are being delivered through the conduits 40 and 44, valve 46 and conduit 48 via the pump 52 to the pool-sweep or aerator 50. The pool-sweep therefore delivers the carbon dioxide from the compressor 38 and permits the gas to escape into the water of the pool wherein it is caused to rise or be percolated therethrough. The carbon dioxide contained within the by-products serves as an acid forming substance for driving the pH of the pool downward. In practice, it has been found that the pH of the water should be maintained at approximately 7 or 8, on a 14 point pH scale. This range is, in essence, the so-called neutral pH range. Therefore, the quantity of carbon dioxide, which serves as an acid forming substance may be selectively controlled by controlling the duration of the operation of the valve 24 and the associated jets 30. Since this duration can be readily determined, the timer 28 is set to switch "on" and "off" at desired intervals to achieve the required hydrocarbon oxidation and subsequent desired percolation of the thus acquired carbon dioxide through the pool-sweep, so that the pool-sweep is caused to act as an aerator for the body of water within the pool.

As aforediscussed, it is desired that ambient atmosphere serves as a source of oxygen in achieving oxidation of microorganisms and organic material, such as bacteria and algae within the pool. Therefore, in order that the oxygen be effectively employed, it is desirable that it be percolated throughout the pool sufficiently for permitting the oxygen to engage all molecules of the water for achieving the desired oxidation. This, in practice, is achieved by opening the valve 62 for a determinable period of time, whereby ambient atmosphere is drawn through the openings 56 and 58, into the chamber 54 through the air intake 60 into the conduit 40 by the compressor 38 and delivered therefrom through the conduit 40 to the conduit 48, through the valve 46 and thence through the pump 52 to the pool-sweep 50 to be percolated throughout the water of the pool. The extent of percolation is controlled by regulating the operation of the valves 24 and 62, through utilization of the timer 28, whereby the valve 62 is rendered effective for delivering ambient atmosphere during selected periods of operation.

For reasons readily apparent, percolating ambient atmospheric air through the pool water inherently causes the atmospheric air to displace various gases present in the water, including gases resulting from an oxidation of organic materials as well as the vaporized carbon dioxide. Of course, a removal of the carbon dioxide, the acid forming substance, tends to reduce the overall acidity of the water and thus raise the pH of the pool. In this manner, the pH of the pool is driven upwardly during the periods in which percolation of atmospheric air is effected. Consequently, the ratio of the total volume of ambient atmospheric air to the total volume of carbon dioxide introduced into the pool water, during a given cycle of operation, should be so regulated that the pH is at all times maintained at a value ranging between 6.5 and 8.3 in order to avoid the effects of excessive acidity and to preclude precipitation of the catalytic ions.

While the source of hydrocarbon has been indicated to be methane or natural gas it should be readily apparent that numerous other hydrocarbons capable of being oxidized for producing carbon dioxide may be employed in the system. It should also be apparent that while combustion has been found to be a convenient source of carbon dioxide, various other sources are available and could readily be employed. In such instances, the system should include convenient structure necessary for introducing the oxygen and carbon dioxide into the water.

In view of the foregoing, it should readily be apparent that the present invention provides an improved method and system for purifying water, particularly water to be employed in swimming pools wherein oxygen serves to kill micro-organisms and which may be employed in conjunction with or be used in lieu of existing methods and systems intended for use in purifying water for human uses.

Although the invention has been herein shown and described in what is conceived to be the most practical and preferred method and system, it is recognized that departures may be made therefrom within the scope of the invention, which is not to be limited to the details disclosed herein but is to be accorded the full scope of the claims so as to embrace any and all equivalent methods and systems.

Having described my invention, what I claim as new and desire to secure by Letters Patent is:

1. In a method for purifying a body of pool water contained within a swimming pool of the type including a traveling pool-sweep adapted to advance and circulate water along the lower surfaces thereof, the steps comprising:
   (A) introducing water soluble metallic ions into the body of pool water;
   (B) maintaining the pool water at essentially a neutral pH value; and
   (C) pumping ambient atmosphere through the pool-sweep into the pool water as the pool-sweep advances along the surfaces thereof, whereby oxygen contained within the atmosphere is percolated through the body of pool water for effecting oxidation of bacteria and organic materials contained within the body of pool water.

2. The method of claim 1 additionally comprising the step of acquiring carbon dioxide from an open methane flame and delivering the thus derived carbon dioxide to the pool-sweep.

3. The method of claim 2 further comprising the step of alternating the delivery of oxygen and carbon dioxide to the pool-sweep.

4. The method of claim 2 comprising the step of controlling delivery of carbon dioxide to the pool-sweep by regulating the methane flame.

5. A method of purifying a body of water confined within a swimming pool and the like equipped with a travelling pool-sweep for circulating water along the lower surfaces of the pool, comprising the steps of:
   (A) introducing metallic ions into the body of water;
   (B) intermittently delivering carbon dioxide from said pool-sweep into said body of water for predetermined intervals of time; and
   (C) intermittently delivering ambient atmosphere containing oxygen from said pool-sweep into said body of water for predetermined intervals of time sequentially alternating with the intervals of time during which carbon dioxide is delivered from said pool-sweep so that carbon dioxide and ambient atmosphere are delivered from said pool-sweep and percolated throughout the body of water at alternating intervals as the pool-sweep is caused to travel along the lower surfaces of the pool.

6. A system for purifying a body of water confined within a swimming pool and the like comprising:
   (A) means including a pool-sweep mounted within said swimming pool adjacent to the interface of the surface of the pool with the body of water for introducing gas into said body of water adjacent the interface;
   (B) means for selectively introducing water soluble compounds capable of liberating metallic ions into said body of water;
   (C) means including a cyclically operable hydrocarbon burner for generating vaporized carbon dioxide;
   (D) burner valve means for controlling the operation of the hydrocarbon burner;
   (E) gas delivery means including a conduit and a gas compressor;
   (F) means connecting the gas delivery means with said pool-sweep and with said hydrocarbon burner for introducing vaporized carbon dioxide generated by said hydrocarbon burner into said body of water through said pool-sweep whereby the carbon dioxide is caused to percolate through said body;
   (G) a cyclically operable atmospheric valve means for introducing ambient atmosphere into said conduit, whereby oxygen contained in the ambient atmosphere is introduced by the pool-sweep into said body of water and percolated therethrough; and
   (H) means including a timing device connected with said burner valve means and said atmospheric valve means for imposing alternating cyclic operations on said burner and said atmospheric valve means, whereby the carbon dioxide and atmosphere alternately are percolated through said body of water.

7. In a method of purifying a body of water the steps comprising:
   (A) introducing into said body of water free metallic ions;
   (B) intermittently percolating a first gas consisting essentially of carbon dioxide through the body of water for predetermined periods of time; and
   (C) intermittently percolating a second gas consisting essentially of ambient atmosphere through the body of water for predetermined periods of time alternating with the periods of time during which said first gas is percolated through said body of water, whereby the acidity of said body of water is maintained at a level sufficient for maintaining said metallic ions in a free state and oxidizable materials present within the body of water are contacted by said second gas and oxidized in the presence of ions in a free state.

References Cited

UNITED STATES PATENTS

| | | | |
|---|---|---|---|
| 3,192,146 | 6/1965 | Vellas et al. | 210—169 X |
| 3,217,886 | 11/1965 | Ruston | 210—169 |
| 3,261,371 | 7/1966 | Vernon | 210—169 X |
| 3,329,607 | 7/1967 | Colobert et al. | 210—63 |
| 3,363,766 | 1/1968 | Van den Broek et al. | 210—169 |
| 3,412,741 | 11/1968 | Mills | 210—169 X |
| 3,428,559 | 2/1969 | McInnis | 210—169 X |

MICHAEL ROGERS, Primary Examiner

U.S. Cl. X.R.

210—60, 63, 169, 192, 199